United States Patent
Matti

(10) Patent No.: US 7,099,918 B2
(45) Date of Patent: Aug. 29, 2006

(54) WEB-BASED FORM VALIDATION SYSTEM AND METHOD

(75) Inventor: Michael C. Matti, Durham, NC (US)

(73) Assignee: SAS Institute Inc., Cary, NC (US)

( * ) Notice: Subject to any disclaimer, the term of this patent is extended or adjusted under 35 U.S.C. 154(b) by 738 days.

(21) Appl. No.: 10/222,691

(22) Filed: Aug. 16, 2002

(65) Prior Publication Data

US 2004/0054755 A1   Mar. 18, 2004

(51) Int. Cl.
*G06F 15/16* (2006.01)

(52) U.S. Cl. ............... 709/203; 709/218; 709/230; 705/8; 705/9; 705/10; 705/26

(58) Field of Classification Search .......... 709/203, 709/218, 230; 705/8, 9, 10, 26
See application file for complete search history.

(56) References Cited

U.S. PATENT DOCUMENTS

| | | | |
|---|---|---|---|
| 5,113,341 A | 5/1992 | Kozol et al. | |
| 5,185,698 A | 2/1993 | Hesse et al. | |
| 5,367,619 A | 11/1994 | Dipaolo et al. | |
| 5,418,950 A | 5/1995 | Li et al. | |
| 5,444,841 A | 8/1995 | Glaser et al. | |
| 5,450,538 A | 9/1995 | Glaser et al. | |
| 5,471,613 A | 11/1995 | Banning et al. | |
| 5,544,285 A | 8/1996 | Glaser et al. | |
| 5,721,901 A | 2/1998 | Banning et al. | |
| 5,774,123 A | 6/1998 | Matson | |
| 5,787,418 A | 7/1998 | Hibbetts et al. | |
| 5,835,712 A | 11/1998 | DuFresne | |
| 5,909,684 A | 6/1999 | Nelson | |
| 5,963,938 A | 10/1999 | Wilson et al. | |
| 5,963,952 A | 10/1999 | Smith | |
| 5,966,126 A | 10/1999 | Szabo | |
| 6,031,836 A | 2/2000 | Haserodt | |
| 6,044,382 A | 3/2000 | Martino | |
| 6,137,488 A | 10/2000 | Kraft et al. | |
| 6,295,531 B1 | 9/2001 | Bae et al. | |
| 2002/0023024 A1* | 2/2002 | Kaimowitz | 705/26 |
| 2003/0140117 A1* | 7/2003 | Kunz | 709/218 |

OTHER PUBLICATIONS

Wise Solutions, How to Enable/Disable Pushbuttons, Jan. 2001, Article #1127, Tech Info News—Scripting Dialogs.*
(Supplementary Attachment) Untitled Document; DWFAQ.com; JavaScript.*

* cited by examiner

*Primary Examiner*—Zarni Maung
*Assistant Examiner*—Glenford Madamba
(74) *Attorney, Agent, or Firm*—Jones Day

(57) ABSTRACT

A client-side computer-implemented system and method for performing validations across multiple control elements on a web-based form. The form includes an array of web-based control elements for acquiring responses from a user. Trans-control element rules contain validation rules that are based upon state information from a plurality of the web-based control elements. A control element handler modifies a property of a control element within the array after using the trans-control element rules to examine the state information contained within the array.

30 Claims, 18 Drawing Sheets

Please rank all the choices shown, using "1" as your top choice.

- Alpha q1_option[0]
  q1_alpha_tag.style.backgroudColor=''
  1○ 2○ 3○ 4○ 5○
  q1_value[0]=0

- Beta q1_option[1]
  q1_beta_tag.style.backgroudColor=''
  1○ 2○ 3○ 4○ 5○
  q1_value[1]=0

- Gamma q1_option[2]
  q1_gamma_tag.style.backgroudColor='#eed'
  1● 2○ 3○ 4○ 5○
  q1_value[2]=1

- Delta q1_option[3]
  q1_delta_tag.style.backgroudColor='#eed'
  1○ 2○ 3● 4○ 5○
  q1_value[3]=3

- Epsilon q1_option[4]
  q1_epsilon_tag.style.backgroudColor=''
  1○ 2○ 3○ 4○ 5○
  q1_value[4]=0

FIG. 17

WEB-BASED FORM VALIDATION SYSTEM AND METHOD

BACKGROUND

1. Technical Field

The present invention is generally directed to web-based interfaces, and more particularly to web-based form validations.

2. Description of the Related Art

Organizations have used many methods to gather data about individual preferences and opinions. One method of gathering data about a particular subject from multiple individuals is to present the group of individuals with a survey form. An example of this type of form would be a census form where the person completing the form fills in the appropriate response on a computer sheet, which is then optically scanned into a computer system. The computer system then compiles the data and can perform some statistical procedures to provide the organization taking the survey with additional information.

The widespread adoption of personal computers and the introduction of the Internet made the process of conducting a survey far more cost-effective because the organization can present the survey forms through a web-based form. A web-based form can be completed on-line and the results compiled much more quickly and efficiently. However, a web-based form suffers from data quality issues. For example, the responder to a web-based survey form may rank two responses with the same number or may fail to complete questions and thus the data quality of the web-based survey form is diminished.

SUMMARY OF THE INVENTION

In accordance with the teachings disclosed herein, a client-side computer-implemented system and method are provided for performing validations across multiple control elements on a web-based form. The form includes an array of web-based control elements for acquiring responses from a user. Trans-control element rules contain validation rules that are based upon state information from a plurality of the web-based control elements. A control element handler modifies a property of a control element within the array after using the trans-control element rules to examine the state information contained within the array.

BRIEF DESCRIPTION OF THE DRAWINGS

The present invention satisfies the general needs noted above and provides many advantages, as will become apparent from the following description when read in conjunction with the accompanying drawings, wherein:

FIGS. 14–17 are displays of radio button arrays used in an example that shows data values associated with the client-side manipulation of a radio button array.

DETAILED DESCRIPTION

Figure 1:
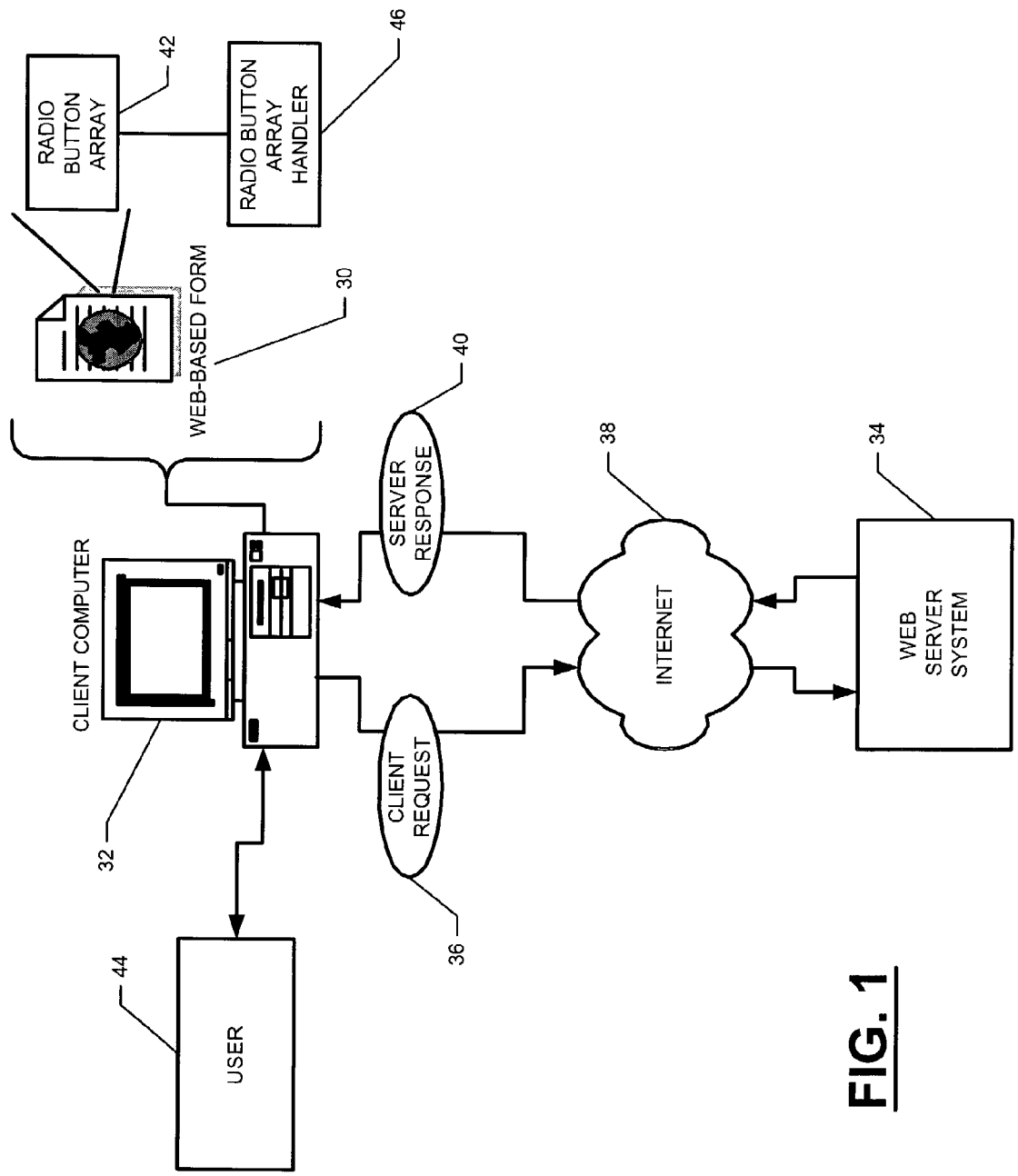
FIG. 1 is a block diagram that depicts a server providing to a client a web-based form.

FIG. 1 depicts a web-based form 30 being provided to a client computer 32 from a server 34. To obtain the web-based form 30, the client computer 32 provides a request 36 for content over the Internet 38 to the web server 34. The web server 34 furnishes the web-based form 30 in its response 40. The web-based form 30 contains a radio button array 42 which a user 44 may manipulate in order to indicate the user's responses to inquiries posed on the web-based form 30.

The server 34 also provides in its response 40 a radio button array handler 46 to operate on the client computer 32. Based upon a user's selection of a radio button value, the radio button array handler 46 may affect values in one or more other radio buttons within the array 42. For example, the web-based form 30 may be asking the user 44 to rank five products from one to five, with one representing the highest ranked product. The user 44 inadvertently attempts to enter the same ranking number for two products. The radio button array handler 46 detects this and alters the value of the other relevant radio button on the web-based form 30 so that the inconsistency is corrected.

Figure 2:
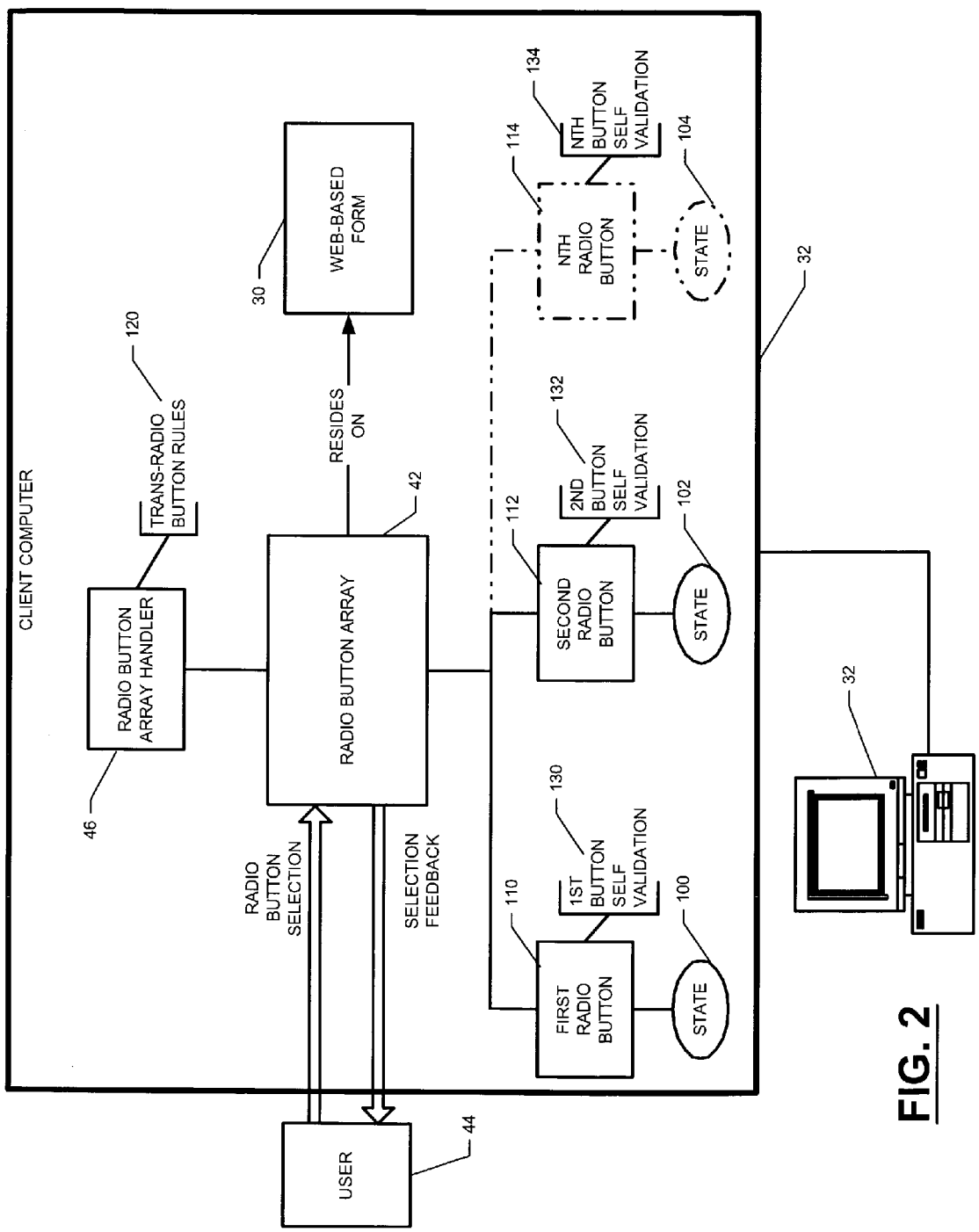
FIG. 2 is a block diagram that depicts client-side software and computer components utilized with a radio button array.

As shown in FIG. 2, the radio button array handler 46 examines the states (100, 102, 104) of multiple radio buttons (110, 112, 114) in order to determine whether any button modification action is required. Trans-radio button rules 120 guide the radio button array handler 46 as to what actions are to be taken and upon which conditions. Trans-radio button rules 120 are directed to performing radio button validations based upon states (100, 102, 104) of multiple radio buttons (110, 112, 114). The radio buttons (110, 112, 114) may also include their own internal self validations (130, 132, 132), such as two values may not be specified for a radio button.

Figure 3:
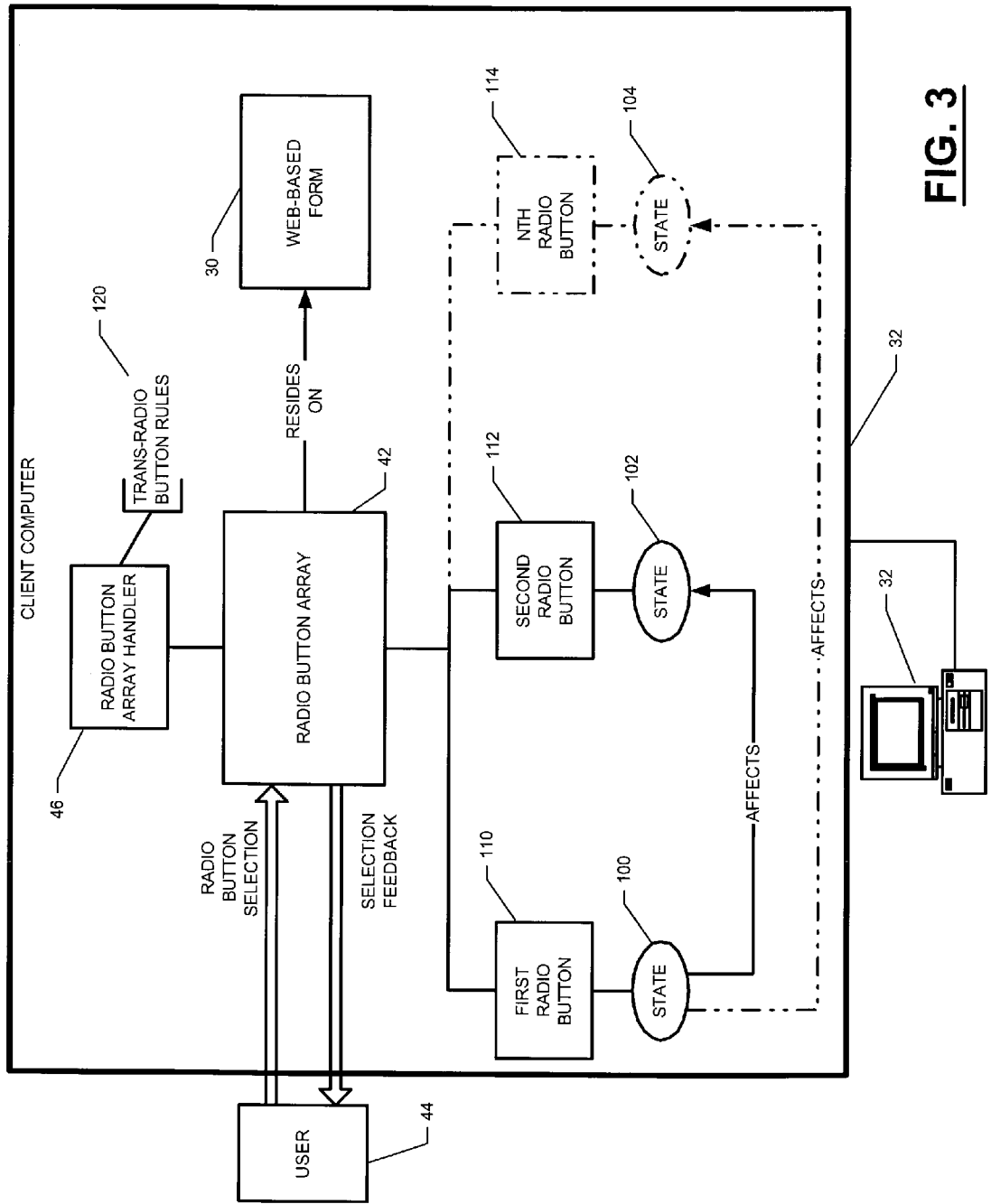
FIG. 3 is a block diagram that depicts the effect of a radio button's state upon the states of other radio buttons.

FIG. 3 depicts that through the trans-radio button rules 120, the radio button array handler 46 allows the state of a radio button (e.g., 110) to affect the states of one or more other radio buttons (e.g., 112, 114). For example, the trans-radio button rules 120 may indicate that radio buttons may not have the same value.

The checking of the conditions and any resultant actions via the trans-radio button rules 120 occur on-the-fly, such as when the user attempts to enter a radio button's value. It should be understood that the terms first, second, and Nth with respect to the buttons (110, 112, 114) shown in FIG. 3 are not reflective of a button's position within the radio button array 42. As an example, the first radio button 110 may occupy the second position within the array 42 and may affect the state of the button occupying the first position as well as the button occupying the third position within the array 42. Moreover, the terms first, second, and Nth do not refer to the order in which a user 44 selects values within the array 42. Rather, the terms refer to any individual radio button appearing within the array without regard to position or selection order.

Figure 4:
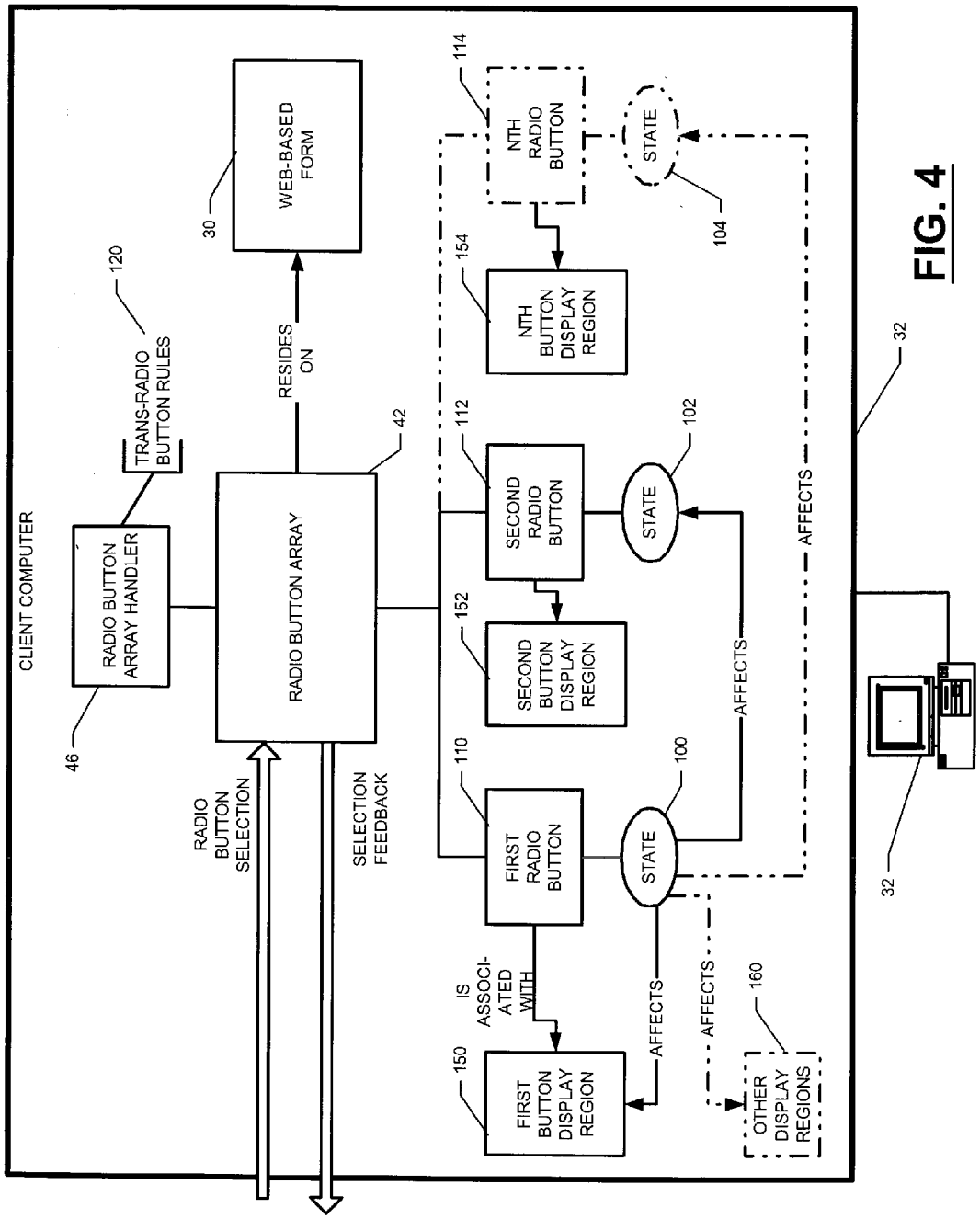
FIG. 4 is a block diagram that depicts the effect of a radio button's state upon display regions.

It should be further understood that the radio button array handler 46 may affect more than the values of radio buttons (110, 112, 114). As shown in FIG. 4, the radio button array handler 46 may modify display regions (150, 152, 154) associated with the radio buttons (110, 112, 114). For example, the display regions of each selection may be tinted so as to keep the user aware of the current selections, and to encourage the user to complete the web-based form 30. While this is useful for any number of radio buttons on an array, the utility of this visual feedback grows when the size of the array exceeds 3×3 items.

The state of the radio button 110 may affect not only a display region 150 associated with the radio button 110, but display regions (e.g., 152, 154) associated with other radio buttons as well as possibly other display regions 160 on the web-based form 30. As an illustration if a user enters duplicate ranking scores within an array, the display regions of both radio buttons may have its color attributes modified so as to highlight that an inconsistency has arisen for these radio buttons.

Figure 5:
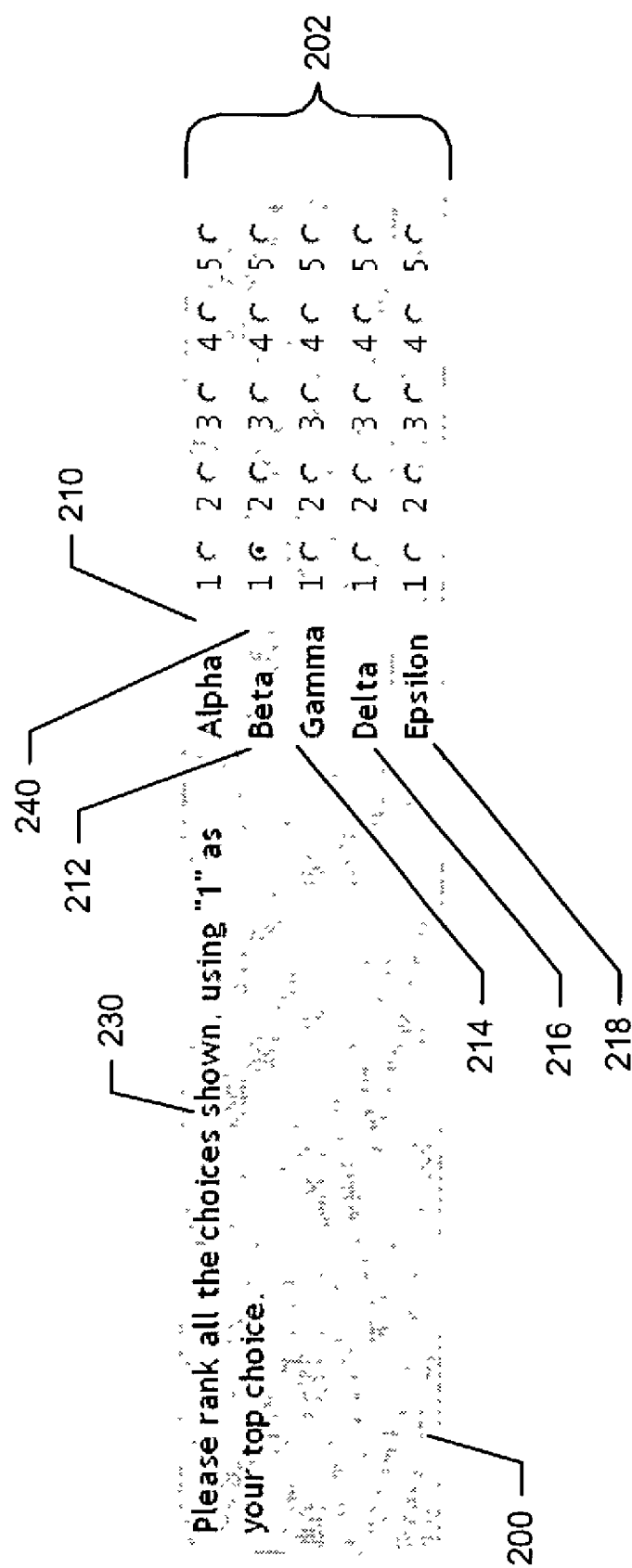
FIGS. 5–12 are displays of a radio button array used in an example of radio buttons' states affecting aspects of the array.

FIGS. 5–12 show an exemplary scenario wherein a user selects values via a radio button array. With reference to FIG. 5, a radio button array 200 contains a grouping 202 of five control elements: Alpha radio button 210, Beta radio button 212, Gamma radio button 214, Delta radio button 216, and Epsilon radio button 218. The array 200 contains a textual description at 230 that asks the user to "Please rank all the choices, using '1' as your top choice." In this example, the user manipulates the Beta radio button 212 so that the value of one is indicated. The radio button display region 240 is tinted to emphasize that this radio button's value has been entered. It should be understood that all or a portion of the display region 240 may be tinted or otherwise modified based upon the state of the radio button.

Figure 6:
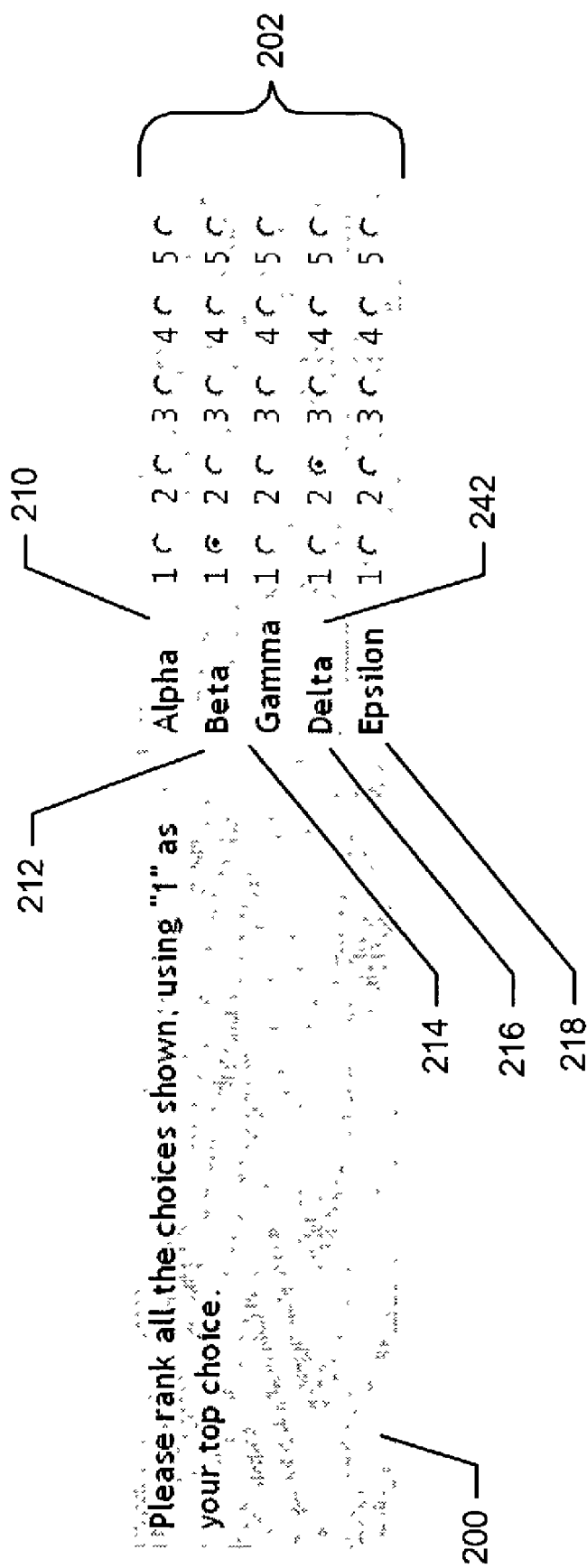

FIG. 6 shows that the user has next manipulated the Delta radio button 216 so that the value of two is indicated. The Delta radio button display region 242 is tinted to emphasize that this radio button's value has been entered.

Figure 7:
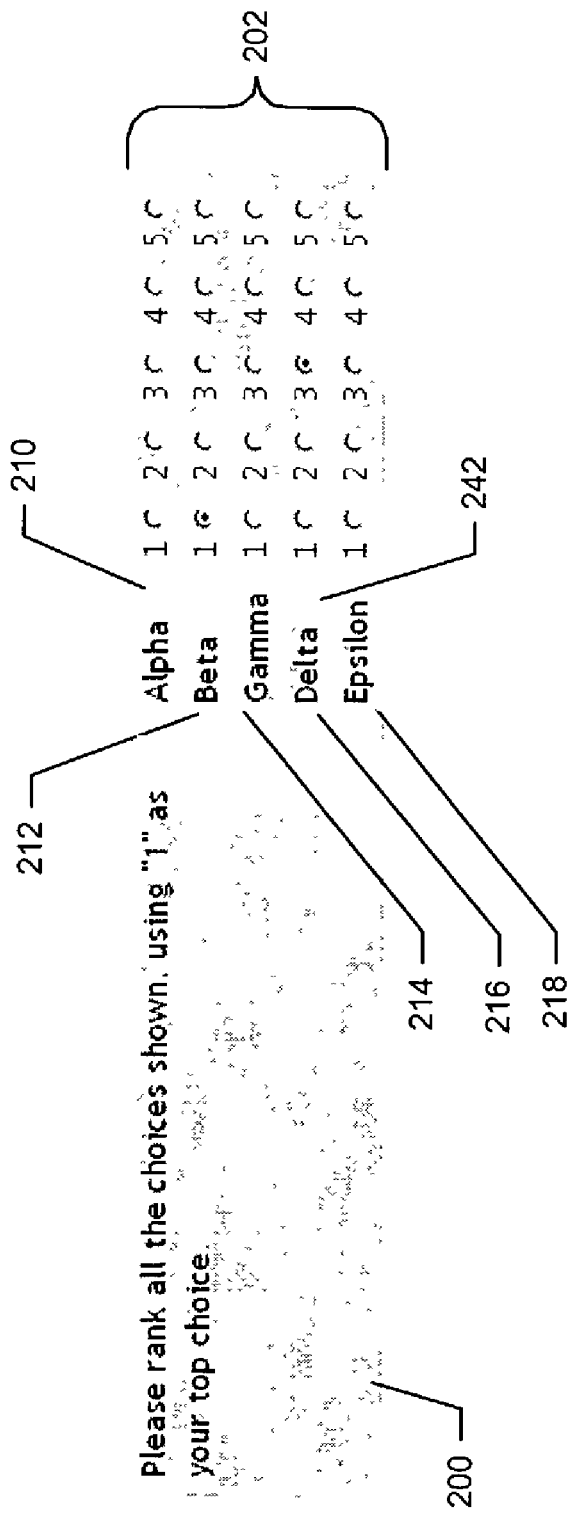

Delta 216 is re-selected as the third choice as shown in FIG. 7. Because radio buttons in this example automatically self-validate within themselves, no intervention is required by the radio button array handler, and the background color of the Delta radio button control element 242 is not changed.

Figure 8:
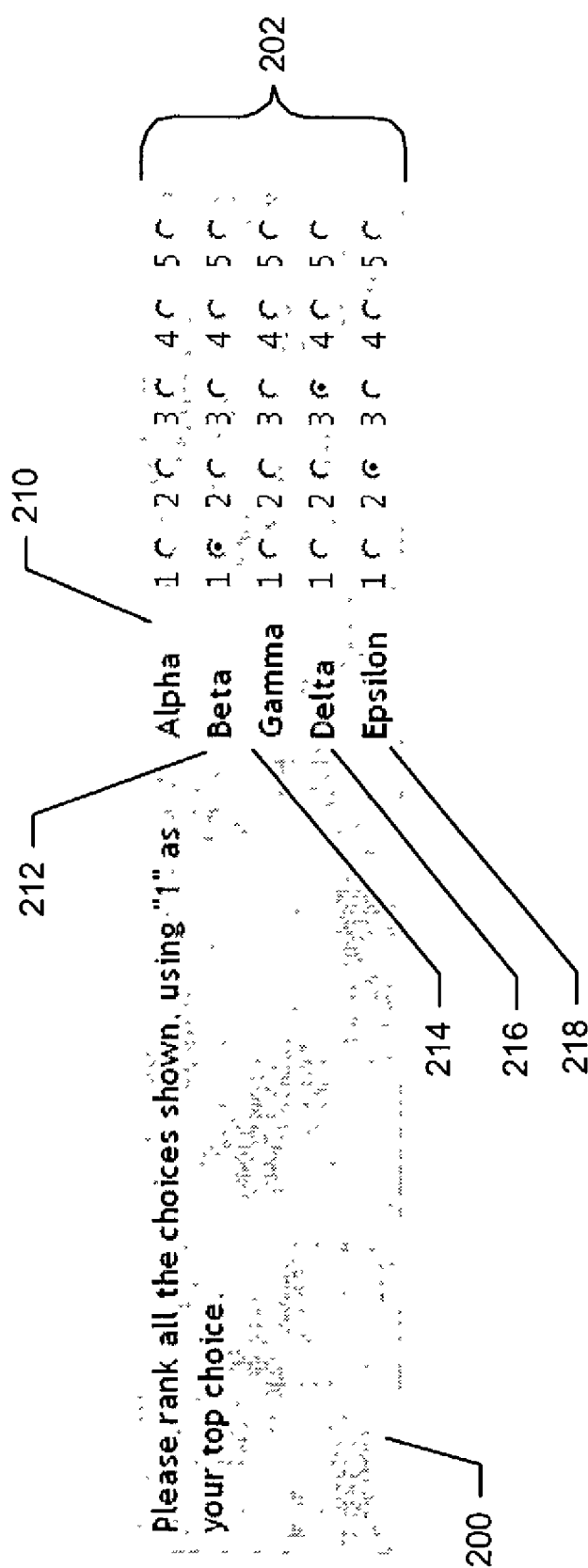
Figure 9:
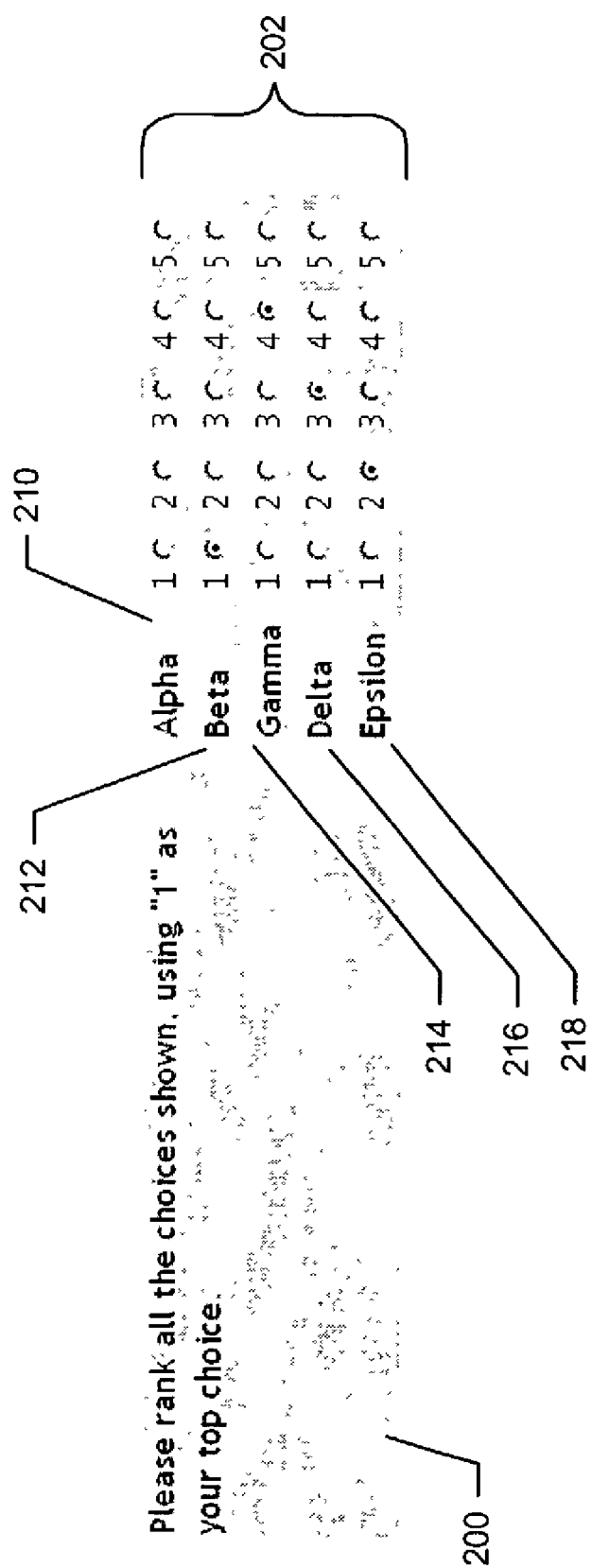
Figure 10:
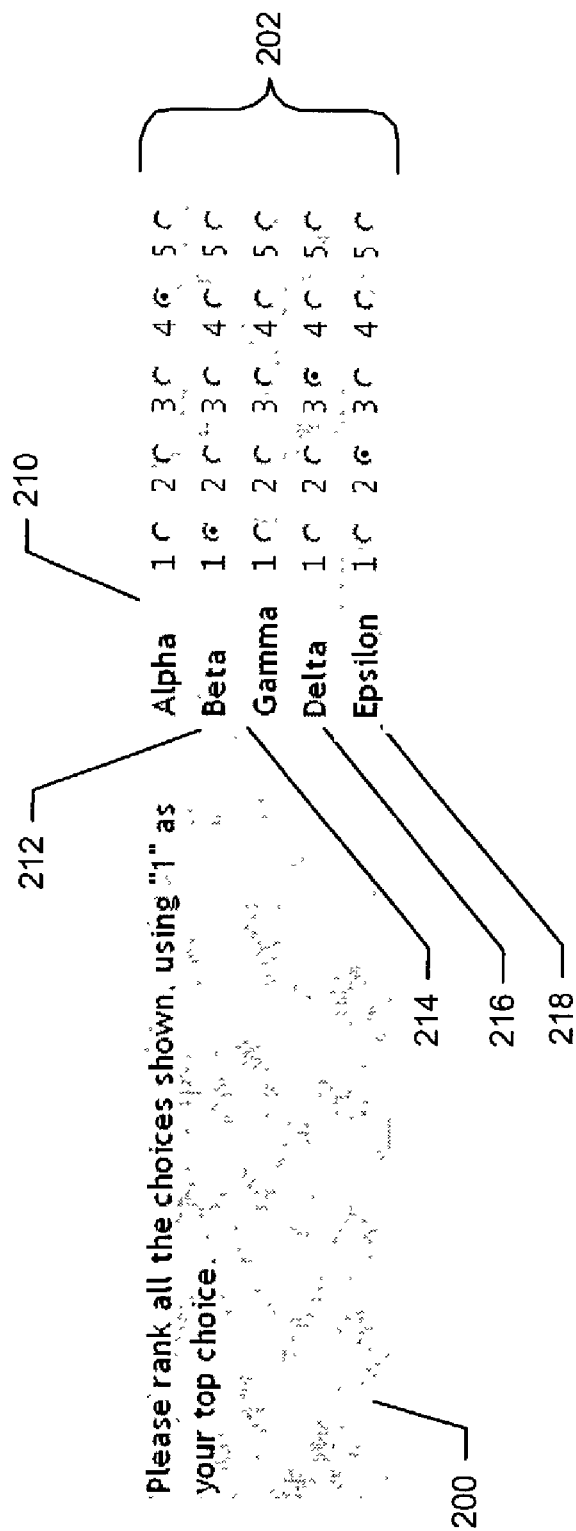
Figure 11:
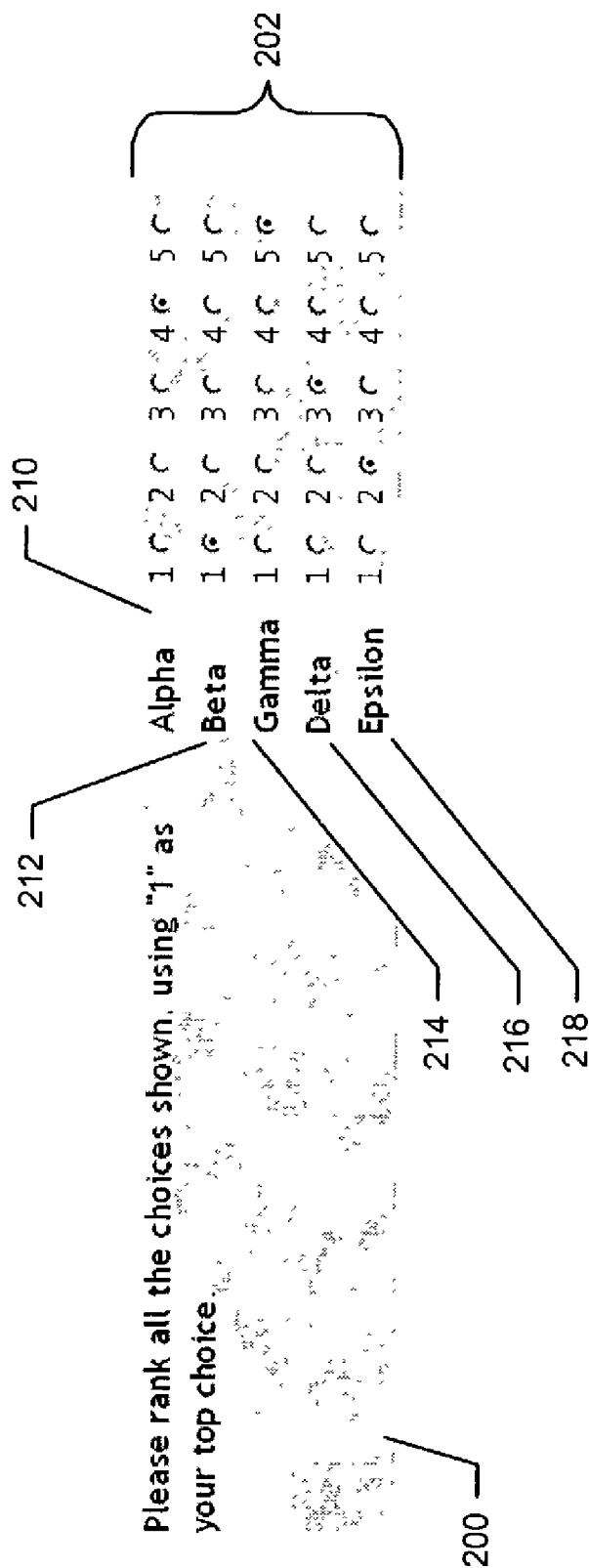

The user makes Epsilon 218 the second choice as shown in FIG. 8 and makes Gamma 214 the fourth choice as shown in FIG. 9. If the user makes the Alpha control element 210 the fourth choice, the radio button array handler automatically de-selects button 4 under the Gamma option 214 and clears the background color of Gamma 214 as shown in FIG. 10. Finally, the user selects Gamma 214 as the fifth choice, and the form is complete as shown in FIG. 11.

Figure 12:
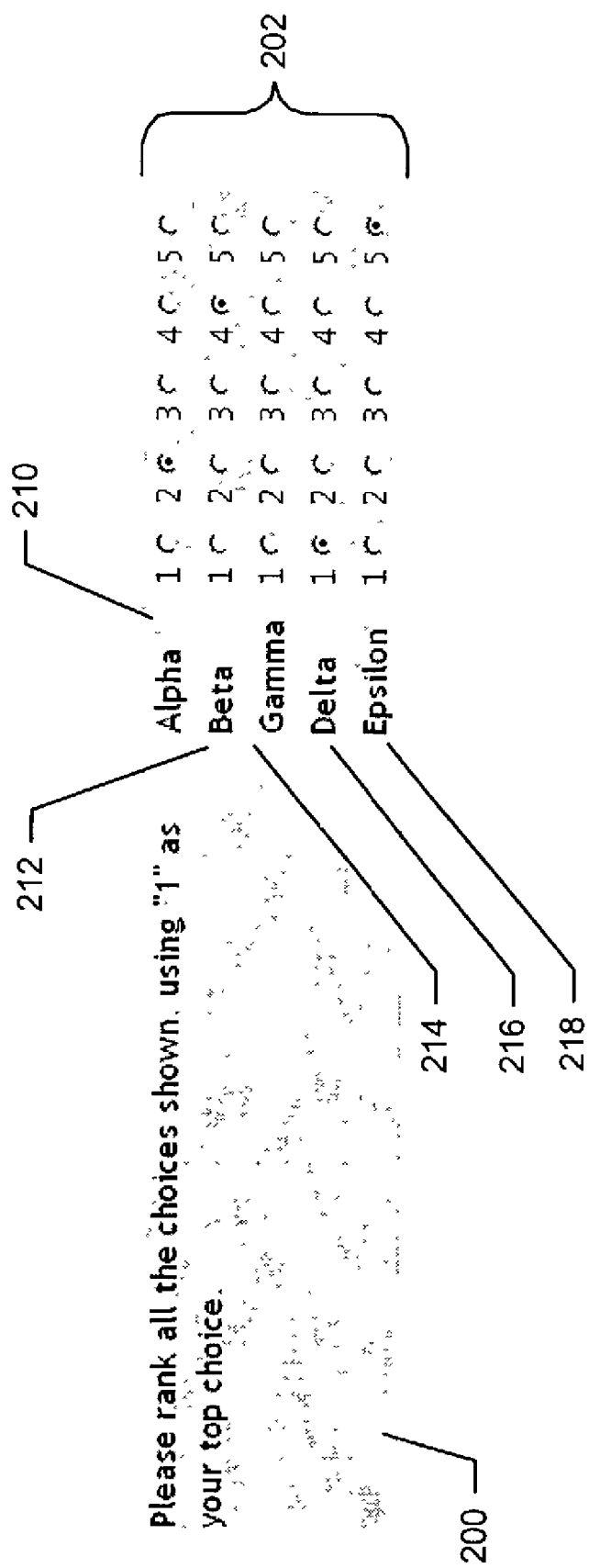

As noted above in relation to visual feedback, the background color of completed selections is altered in real-time so that the background color of the question's stem and response match. This makes button de-selection immediately obvious, and helps the user keep track of what is left to select. It further provides the additional benefit of creating a subtle visual incentive for the user to complete the web-based form as shown in FIG. 12.

Figure 13:
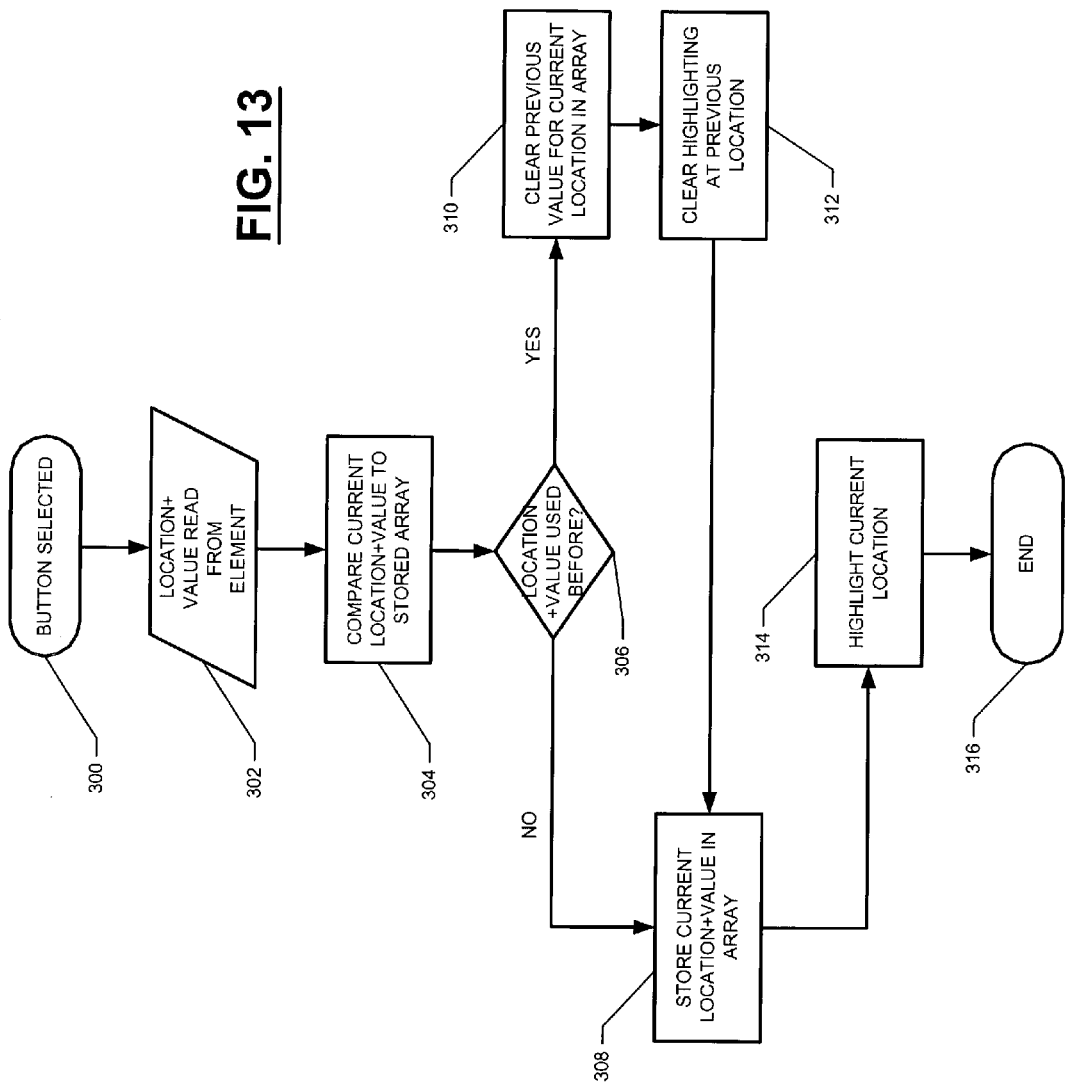
FIG. 13 is a flowchart that depicts operational steps for client-side processing of a radio button array.

FIG. 13 is a flowchart that depicts operational steps for client-side processing of a radio button array. Start block 300 indicates that when a radio button has been selected by a user, the location and the value are read at data block 302 from the radio button element. Process block 304 compares the current location and value to the data stored in the array. If decision block 306 determines that based upon the comparison the location and value were not used before (i.e., these items are not already found in the array), then process block 308 stores the current location and value in the array before processing continues at process block 314.

However if the location and value were used before as determined by decision block 306, the previous value for the current location in the array is cleared at process block 310. Process block 312 then clears the highlighting at the previous location. Processing continues at process block 308 which stores the current location and value in the array before processing continues at process block 314. At process block 314, the current location is highlighted before processing for this iteration ends at block 316.

It should be noted that the operations contained in the flowchart of FIG. 13 are exemplary and may be altered to suit the situation at hand. For example, process block 310 may be altered to indicate to the user that the value has been previously entered and that the user should select a different value for the current radio button element.

The operations described in the flowchart of FIG. 13 are illustrated through the interface displays of FIGS. 14–17. FIGS. 14–17 are displays of a radio button array 200 that shows the control element's data values and color values associated with the manipulation of the radio button arrays. In the scenario of FIGS. 14–17, three button selections are made. The third selection overrides the first one and triggers a reset of the first array value and style attribute. For each button selection in the sequence, the changes to the q1_value[] array and style.backgroundColor attributes are shown at their corresponding locations.

Figure 14:
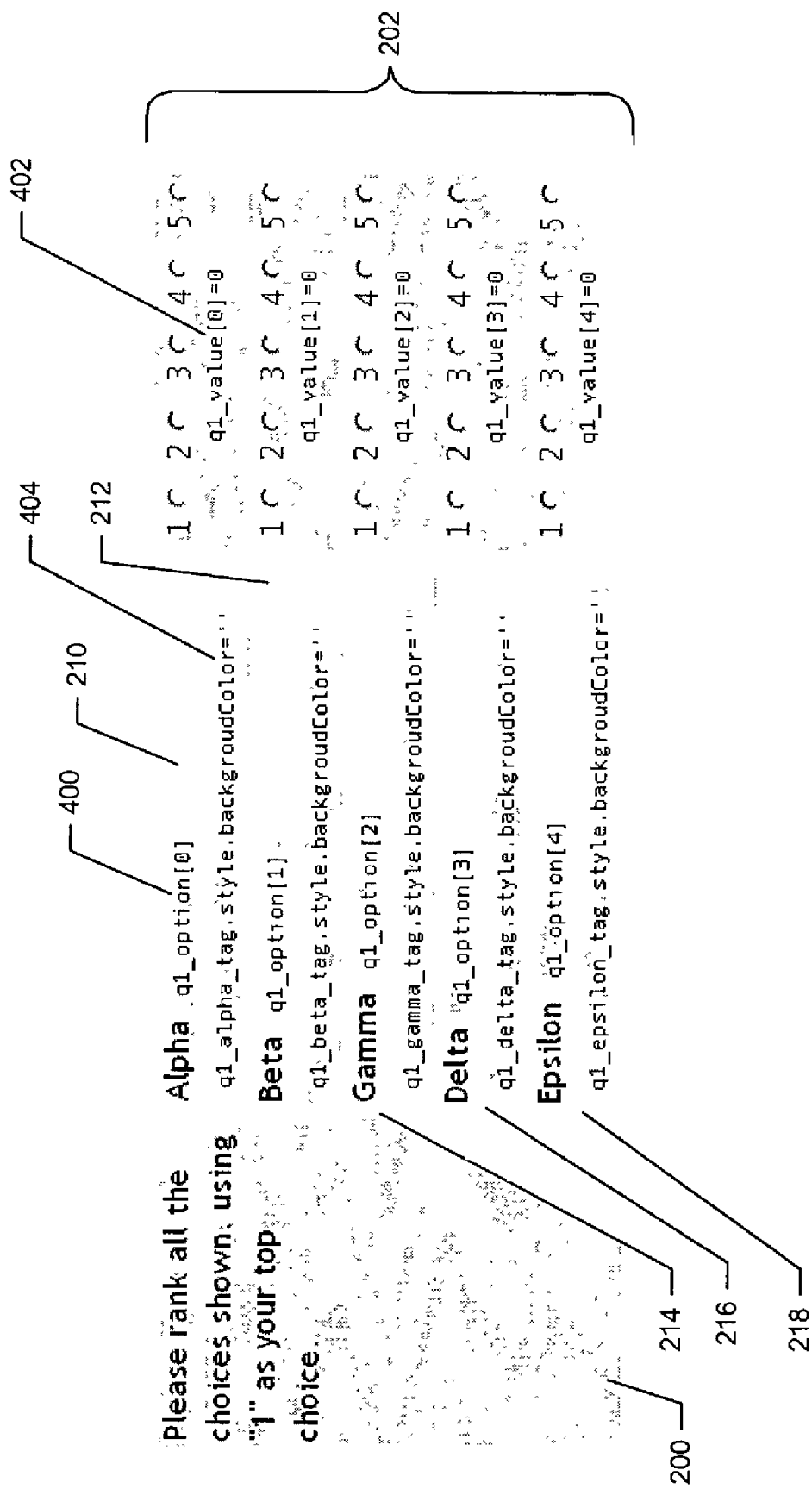

In the sequence shown in FIG. 14, the values of q1_option[] and q1_value[] are displayed within the web-based survey form, as well as the values of the five style.backgroundcolor attributes. For example for the Alpha radio button 210, the q1_option[] and q1_value[] are displayed at 400 and 402 respectively within the web-based survey form, as well as the value of the style.backgroundColor attribute at 404. These values and the values shown for the other radio buttons in FIG. 14 represent the initial state of the web-based form.

Figure 15:
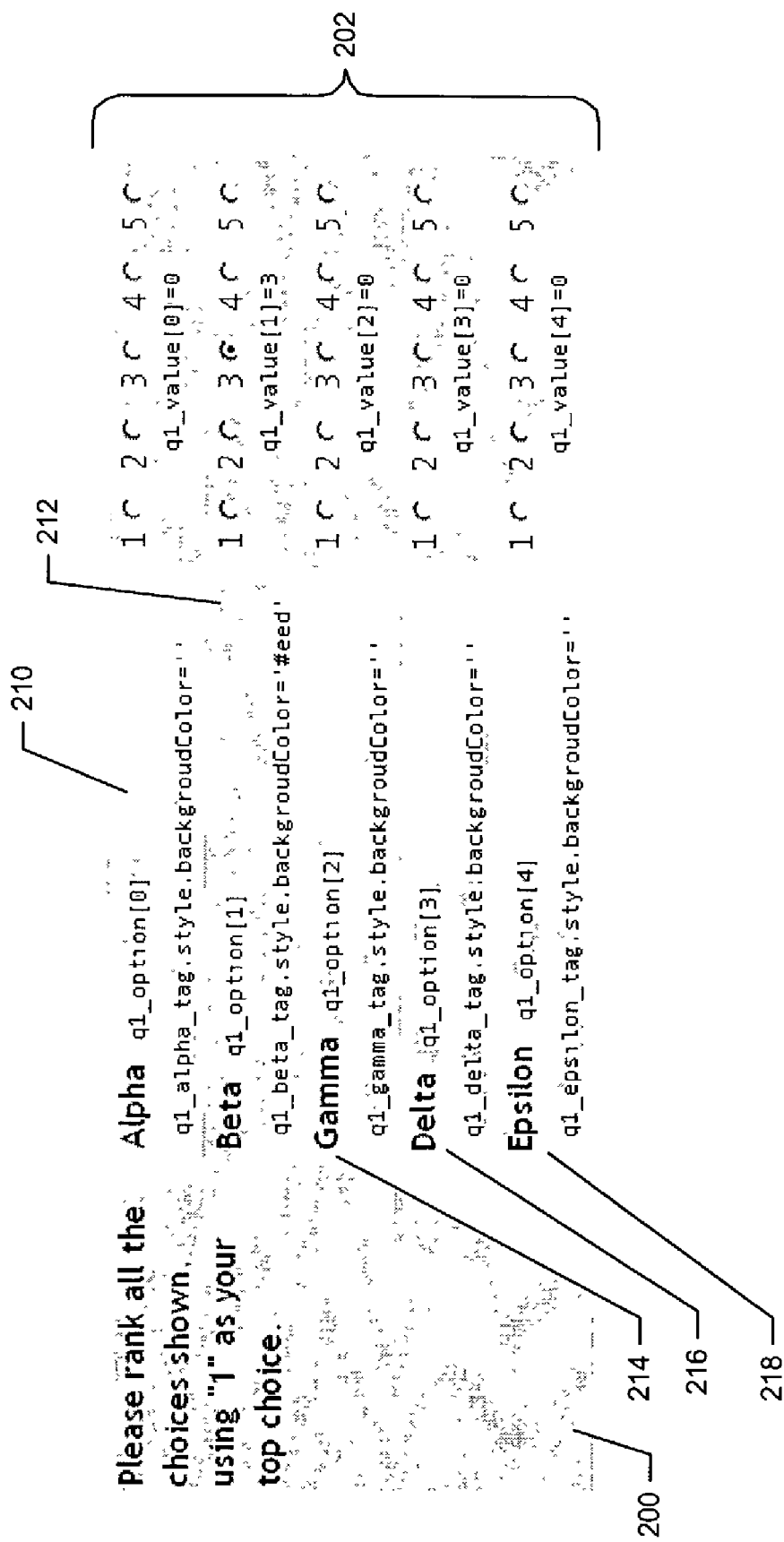

In the display of FIG. 15, the value "3" is selected for the Beta control element 212. The data array and color variables are modified to reflect this selection:

q1_value[1]=3
q1_beta_tag.style.backgroundColor='#eed'

(where '#eed' is in hex RGB format and represents a color value equivalent to light brown)

Figure 16:
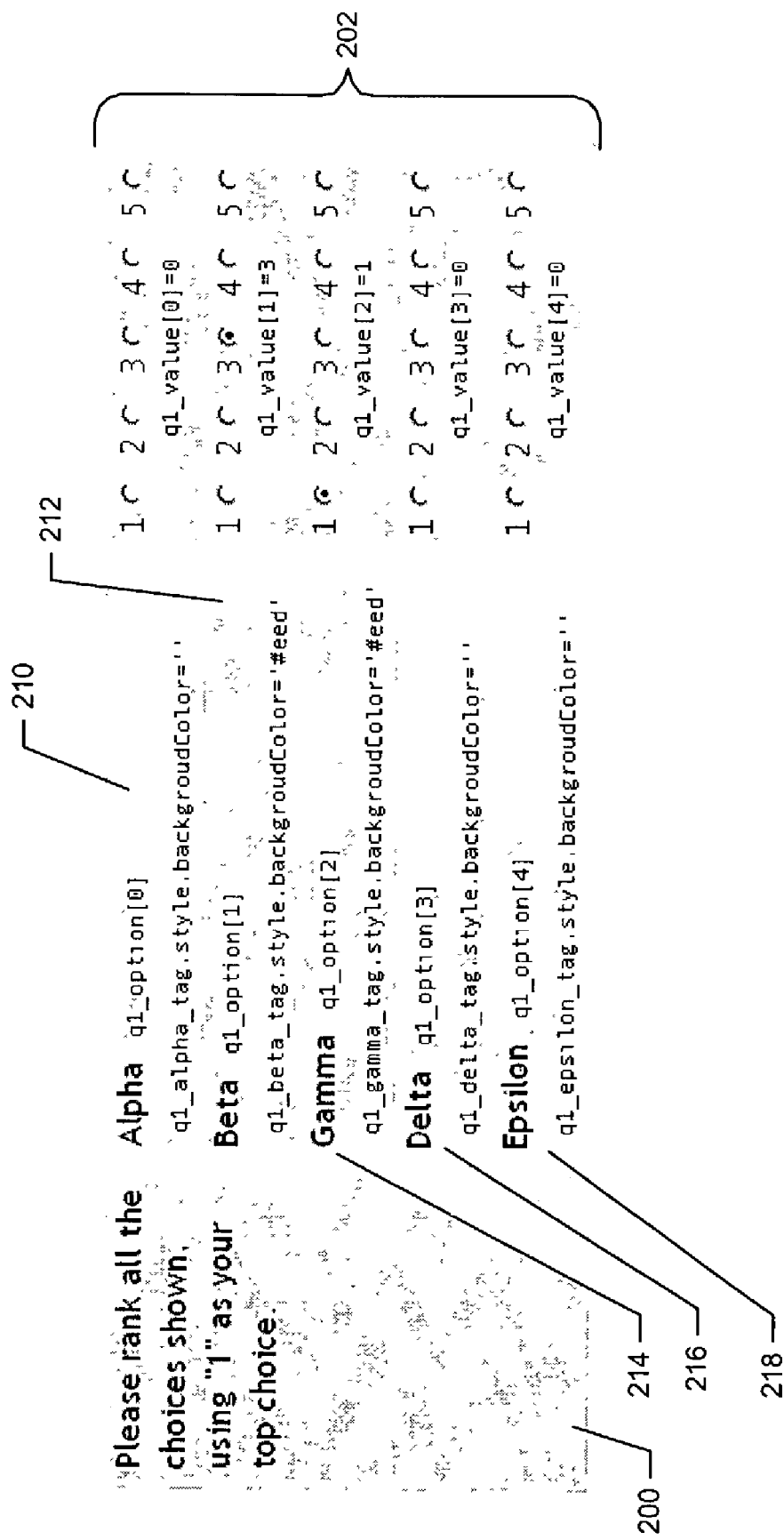

In the display of FIG. 16, the value "1" is selected for the Gamma control element 214. The data array and color variables are modified to reflect this selection:

q1_value[1]=3
q1_beta_tag.style.backgroundColor='#eed'
q1_value[2]=1
q1_gamma_tag.style.backgroundColor='#eed'

In the display of FIG. 17, the value "3" is selected for the Delta control element 216. The data array and color variables are modified to reflect this selection:

q1_value[1]=0 (note: this effectively clears the data value)
q1_beta_tag.style.backgroundColor='' (note: this effectively clears the background color)

```
q1_value[2]=1
q1_gamma_tag.style.backgroundColor='#eed'
q1_value[3]=3
q1_delta_tag.style.backgroundColor='#eed'
```

To implement the web-based system and method described herein, any of a number of client-side processing implementations may be used, such as ActiveX controls, downloadable applets, or Javascript programs. For example in a Javascript implementation, names may be assigned to several elements of the survey form. A name attribute and value are assigned to the form, as well as to each of the button input elements. The names enable the Javascript programming to process the form.

The button input elements may have a name value that includes a question identifier followed by an underscore (_) and the name of that choice. In the current example, the form name is survey, the question is q1, and the input element names are q_alpha, q1_beta, q1_gamma, q1_delta, and q1_epsilon. An onclick event may also be added to each input element, and it calls a valchk( ) function which is described below.

To store button values for validation comparison, a pair of Javascript arrays may be used for each question. The arrays keep track of which values (1–5) have been selected for which option (alpha-epsilon).

The string "_option" is appended to the question name for the option array, and the string "_value" is appended to the question name for the value array. For example, the array statements to record q1 options and values are shown below:

```
<script type="text/javascript" language="javascript"><!--
q1_option=new Array('alpha','beta','gamma','delta','epsilon');
q1_value=new Array(0,0,0,0,);
//--></script>
```

The valchk( ) function is invoked whenever a button is clicked, and it uses these arrays to perform validation. It does the following in this example:
1. Creates a variable named qname to keep track of which question is begin validated. The value of qname is derived by extracting the text string preceding the underscore (_) in the input button element's name. For example, the button named q1_delta yields an qname of q1.
2. Determines the number of elements in the question's option array.
3. For every element in the question's option array, the following is performed:
    a. If the array element's value matches the current button value, the earlier button is unchecked.
    b. The previous array element value is set to 0.
    c. The array value corresponding to the current button equal is set to the button value.

In view of this description, the client side Javascript program may resemble the following in order to process the example discussed above:

```
<script type="text/javascript" language="javascript"><!--
q1_option=new Array('alpha','beta','gamma','delta','epsilon');
q1_value=new Array(0,0,0,0,0);
function valchk(button){
function valchk(button){
    var qname=button.name.substr(0,button.name.indexOf('_'));
    var imax=eval(qname+'_option.length');
    for(i=0;i<imax;i++){
        if(eval(qname+'_value')[i]==button.value){
            document.survey[qname+'_'+
                eval(qname+'_option')[i]][button.value-1].checked=0;
            eval(qname+'_value')[i]=0;}
        if(eval(qname+'_option')[i]==
            button.name.substr(button.name.lastIndexOf('_')+1))
            eval(qname+'_value')[i]=button.value;}}
//--></script>
```

With respect to the visual feedback described in the example above, each table cell may be given an id attribute whose value includes the question name, followed by an underscore (_), followed by the option name, followed by_tag. As an illustration, the table cell containing the option Alpha may be assigned id="q1_alpha_tag". Additional Javascript code for use on the client-side may perform the following in order to provide visual feedback:
1. Define a background color for selected options.
2. Within the valchk( ) function, if a previous button has been de-selected, then
    a. Test whether the browser supports the document.getElementById method.
    b. Using the option array to look up its name, clear the background color of the table cell containing the previously selected option.
3. After setting the button array to the current value,
    a. Test whether the browser supports the document.getElementById method.
    b. Using the current button's name to determine the option, set the background color of the table cell containing the option to the value defined by chktag.

Figure 18:
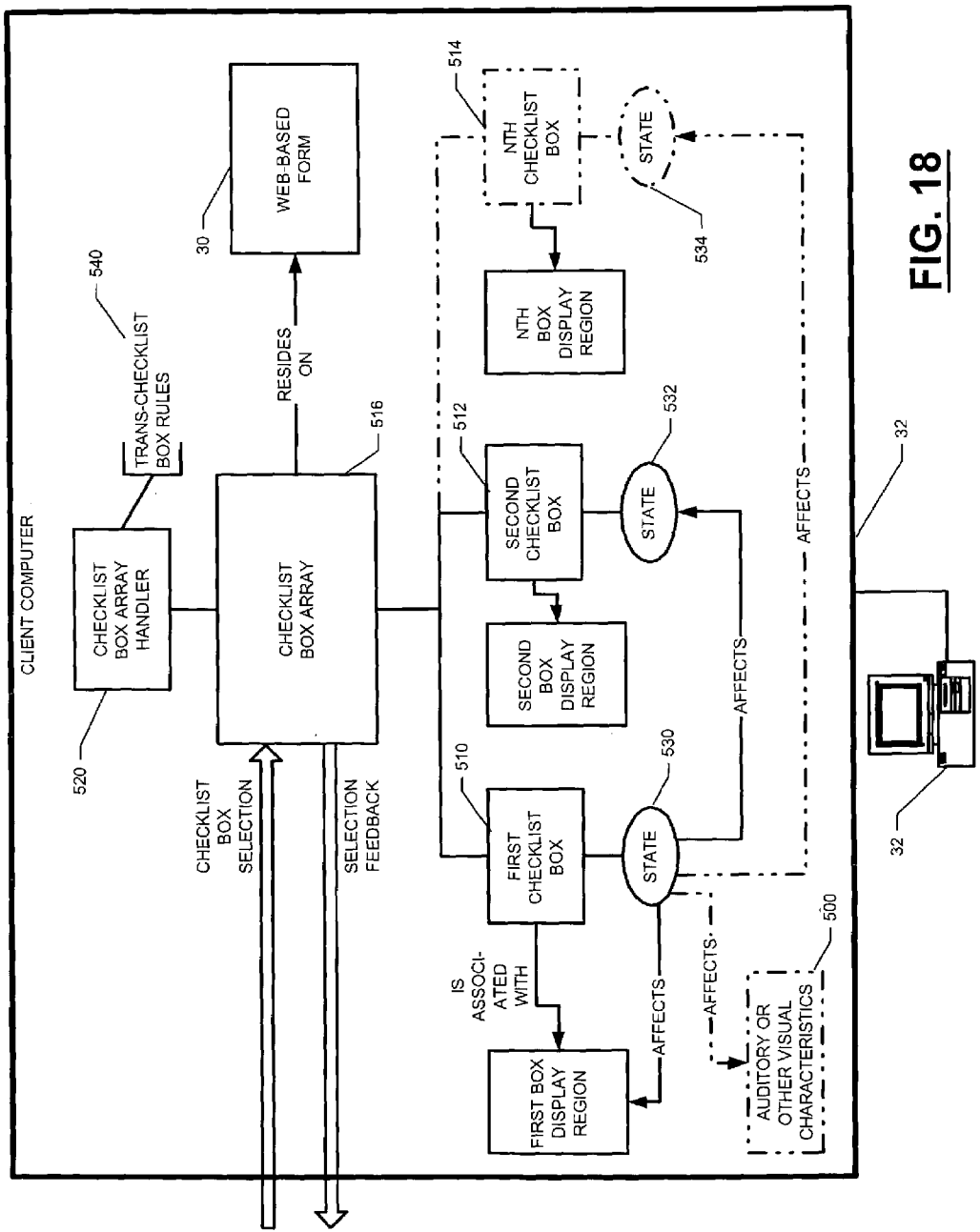
FIG. 18 is a block diagram that depicts the altering of auditory or other visual characteristics based upon use of an array of control elements.

While examples have been used to disclose the invention, including the best mode, and also to enable any person skilled in the art to make and use the invention, the patentable scope of the invention is defined by the claims, and may include other examples that occur to those skilled in the art. As an example of the wide scope of the invention, FIG. 18 illustrates that many different properties may be affected based upon the state of multiple control elements. For example, visual properties other than tinting may be used as shown at 500, such as modifying the text size, text bolding, text italics, or thickness of the control element's border. Auditory properties 500 may also be affected, such as a buzzer being emitted from the user's computer upon the control elements being in a particular state.

Still further to show the wide scope of the invention, different types of grouped-together control elements other than radio buttons may be used, such as checklist box controls elements (510, 512, 514) located within a checklist box array 516. A control element array handler (e.g., checklist box array handler 520) may examine the states (530, 532, 534) of multiple checklist box control elements (510, 512, 514) in order to determine whether any modification action is required. Trans-control element rules (e.g., Trans-checklist box rules 540) guide the handler 520 as to what actions are to be taken and upon which conditions. The rules 540 are directed to performing checklist box validations based upon states (530, 532, 534) of multiple checklist box control elements (510, 512, 514). It should also be noted that the server computer system may provide the rules and handler over many different types of networks, such as an internet network, or a company's intranet network, or a local area network.

The invention claimed is:

1. A client-side computer-implemented apparatus for performing validations on a web-based form, wherein the web-based form was provided by a server over a network, comprising:
    an array of web-based control elements contained in the web-based form for acquiring responses from a user, wherein manipulation of a control element in the array affects the value associated with the control element,
    trans-control element rules containing validation conditions that specify control element-related actions based upon state information from a plurality of the web-based control elements; and
    a control element handler that modifies an input value provided by the user to a first control element within the array after use of the trans-control element rules to examine both the state information of the first control element and the state information of a second control element within the array.

2. The apparatus of claim 1 wherein the web-based form is a survey form;
    said first control element including a plurality of value options for selection by the user;
    said second control element including a plurality of value options for section by the user;
    whereby the value options are used by the user in order to provide responses to inquiries provided in the survey form.

3. The apparatus of claim 1 wherein the network is an internet network.

4. The apparatus of claim 1 wherein the network is an intranet network.

5. The apparatus of claim 1 wherein the network is a local area network.

6. The apparatus of claim 1 wherein a client computer provides a request over the network to the server, wherein the server provides to the client computer the web-based form in response.

7. The apparatus of claim 6 wherein the response from the server comprises the array of web-based control elements, the trans-control element rules, and the control element handler for use by the client computer.

8. The apparatus of claim 1 wherein the web-based control elements comprise radio buttons.

9. The apparatus of claim 1 wherein the web-based control elements comprise checklist boxes.

10. The apparatus of claim 1 wherein control elements include their own separate internal self validations.

11. The apparatus of claim 1 wherein the validation conditions comprise checking values of multiple control values for predetermined error conditions.

12. The apparatus of claim 1 wherein the control element handler modifies the value of the first control element within the array after using the trans-control element rules to examine the data provided by the a user for the second control element within the array.

13. The apparatus of claim 1 wherein the control element handler affects properties of a plurality of control elements contained within the array after using the trans-control element rules to examine the state information of the first and second control elements.

14. The apparatus of claim 1 wherein the checking of the conditions and resultant actions through use of the trans-control element rules occur on-the-fly.

15. The apparatus of claim 1 wherein the checking of the conditions and resultant actions through use of the trans-control element rules occur when the user attempts to enter a control element's value.

16. The apparatus of claim 1 wherein the control element handler modifies a display region associated with the first control element based upon use of the trans-control element rules.

17. The apparatus of claim 1 wherein the control element handler modifies a display region characteristic associated with the first control element based upon use of the trans-control element rules.

18. The apparatus of claim 17 wherein the control element handler changes a display region characteristic associated with the second control element based upon use of the trans-control element rules.

19. The apparatus of claim 18 wherein the control element handler tints the display region associated with the second control element based upon use of the trans-control element rules.

20. The apparatus of claim 18 wherein the changing of the display region characteristic associated with the second control element is performed in order to keep the user who is supplying responses aware of the current selections within the array.

21. The apparatus of claim 20 wherein the changing of the display region characteristic associated with the second control is performed in order to encourage the user to complete the array.

22. The apparatus of claim 1 wherein the control element handler changes a display region characteristic associated with a third control element based upon use of the trans-control element rules, wherein the third control element's changed display region characteristic prevents data entry from occurring with respect to the third control element.

23. The apparatus of claim 1 wherein the control element handler modifies a display region characteristic means associated with the first control based upon use of the trans-control element rules.

24. The apparatus of claim 1 wherein the control element handler modifies an auditory characteristic means associated with the first control based upon use of the trans-control element rules.

25. The apparatus of claim 1 wherein the control element handler comprises an ActiveX control program.

26. The apparatus of claim 1 wherein the control element handler comprises an applet.

27. The apparatus of claim 1 wherein the control element handler comprises Javascript instructions.

28. The apparatus of claim 1 wherein the control element handler comprises Javascript instructions means.

29. A client-side computer-implemented method for performing validations on a web-based form, wherein the web-based form was provided by a server over a network, comprising the steps of:
    receiving, at the client-side from the server, an array of web-based control elements contained in the web-based form, wherein the web-based control elements acquire responses from a user, wherein manipulation of a control element in the array affects the value associated with the control element,
    receiving, at the client-side from the server, trans-control element rules containing validation conditions that specify control element-related actions based upon state information from a plurality of the web-based control elements; and receiving, at the client-side from the server, a control element handler that utilizes the trans-control in relation to the array; and using, at the client-side, the control element handler to modify an input value provided by the user to a second control element within the array after using the trans-control element rules to examine both the state information of the first control element and the state information of a second control element within the array.

30. A client-side computer-implemented apparatus for performing validations on a web-based form, wherein the web-based form was provided by a server over a network, comprising the steps of:

means for receiving, at the client-side from the server, an array of web-based control elements contained in the web-based form, wherein the web-based control elements acquire responses from a user, wherein the manipulation of a control element in the array affects the value associated with the control element, means for receiving, at the client-side from the server, trans-control element rules containing validation conditions that specify control element-related actions based upon state information from a plurality of the web-based control elements; and means for receiving, at the client-side from the server, a control element handler that utilizes the trans-control in relation to the array; and means for using, at the client-side, the control element handler to modify an input value provided by the user to a second control element within the array after using the trans-control element rules to examine both the state information of the first control element and the state information of a second control element within the array.

* * * * *